United States Patent
Ramey et al.

(10) Patent No.: US 7,128,886 B2
(45) Date of Patent: Oct. 31, 2006

(54) SODIUM CARBONATE AND SODIUM BICARBONATE PRODUCTION FROM NAHCOLITIC OIL SHALE

(75) Inventors: Max E. Ramey, Rifle, CO (US); John S. McEwan, Parachute, CO (US); Kevin L. Green, Parachute, CO (US); Charles L. Yates, Parachute, CO (US); Allan L. Turner, Lakewood, CO (US); Michael A. Rockendal, Danville, CA (US); Irvin P. Nielsen, Rifle, CO (US); Michael P. Hardy, Grand Junction, CO (US); Rex Goodrich, Grand Junction, CO (US)

(73) Assignee: Solvay Chemicals, Inc., Houston, TX (US)

( * ) Notice: Subject to any disclaimer, the term of this patent is extended or adjusted under 35 U.S.C. 154(b) by 237 days.

(21) Appl. No.: 10/622,162

(22) Filed: Jul. 15, 2003

(65) Prior Publication Data

US 2004/0026982 A1 Feb. 12, 2004

Related U.S. Application Data (63) Continuation of application No. 09/480,092, filed on Jan. 10, 2000, now Pat. No. 6,609,761.

(60) Provisional application No. 60/115,184, filed on Jan. 8, 1999.

(51) Int. Cl.
*C01D 7/00* (2006.01)

(52) U.S. Cl. .................. 423/421; 423/426; 423/206.2

(58) Field of Classification Search ................ 423/421, 423/426, 206.2; 23/302 T; 299/4, 5, 3; 166/303

See application file for complete search history.

(56) References Cited

U.S. PATENT DOCUMENTS

| | | | | |
|---|---|---|---|---|
| 3,779,602 | A | * | 12/1973 | Beard et al. .................... 299/5 |
| 5,283,054 | A | * | 2/1994 | Copenhafer et al. ...... 423/206.2 |
| 6,228,335 | B1 | * | 5/2001 | Copenhafer et al. ...... 423/206.2 |

* cited by examiner

*Primary Examiner*—Steven Bos
(74) *Attorney, Agent, or Firm*—Brinks Hofer Gilson & Lione (57) ABSTRACT

A method for solution mining nahcolite, capable of extracting nahcolite from geological formations lean in nahcolite comprising injecting high pressure water (which may include recycled aqueous solution of bicarb and sodium carbonate) at a temperature of at least 250° F. into the formation, dissolving nahcolite in the hot water to form a production solution and recovering the production solution. The invention also includes the processing of the production solution to provide sodium carbonate and, optionally, sodium bicarbonate, comprising: decomposing the sodium bicarbonate portion of the hot aqueous production solution to form a hot aqueous solution of sodium carbonate; evaporating water from the hot aqueous solution comprising sodium carbonate to form a concentrated solution of sodium carbonate; producing sodium carbonate monohydrate from the concentrated solution of sodium carbonate by crystallization; and dewatering and calcining the sodium carbonate monohydrate to produce anhydrous sodium carbonate.

74 Claims, 7 Drawing Sheets

AMERICAN SODA, LLP
WELL CROSS SECTIONS

FIGURE 3A
CROSS SECTION DETAIL A-A'

FIGURE 3B
CROSS SECTION DETAIL A-A'

FIGURE 3C
CROSS SECTION DETAIL A-A'

FIGURE 3D
CROSS SECTION DETAIL A-A'

NOTE: SEE FIGURE 3E FOR VERTICAL VIEW

NOT TO SCALE

FIGURE 5
AMERICAN SODA, LLP

SOLUBILITY OF SODIUM BICARBONATE
versus TEMPERATURE

FIGURE 6
AMERICAN SODA, LLP
PRESSURE REQUIRED TO PREVENT DECOMPOSITION OF SATURATED SODIUM BICARBONATE SOLUTION

SODIUM CARBONATE AND SODIUM BICARBONATE PRODUCTION FROM NAHCOLITIC OIL SHALE

This application is a continuation of U.S. patent application Ser. No. 09/480,092, filed Jan. 10, 2000, now U.S. Pat. No. 6,609,761, which claims the benefit of provisional application No. 60/115,184, filed Jan. 8, 1999.

I. FIELD OF THE INVENTION

The invention relates to the solution mining and decomposition of nahcolite, an ore consisting primarily of sodium bicarbonate, to produce sodium carbonate ("soda ash") and sodium bicarbonate ("bicarb").

II. BACKGROUND OF THE INVENTION

There have been a number of prior art processes attempting to recover soda ash and/or bicarb from nahcolite deposits. We have now found that the process of producing these compounds by solution mining of nahcolite deposits at high temperatures is more economical and has a number of other advantages. In particular, the present invention involves the in situ solution mining of nahcolite using high temperature (i.e., above 250° F.), high pressure water and the subsequent processing of the production solution to produce soda ash and bicarb. The invention enables bicarb and soda ash to be economically recovered, not only from beds of virtually pure nahcolite, but also from oil shale containing much smaller amounts of nahcolite embedded therein.

Prior to this invention, no one had appreciated the benefits that could be achieved through the high temperature solution mining of nahcolite and the recovery of sodium carbonate and sodium bicarbonate. Indeed, prior art processes utilized solution mining temperatures below 250° F. and preferably below 200° F. (See, e.g., U.S. Pat. No. 4,815,790 to Rosar et al. and assigned to NaTec, Ltd.). Others advocated adding acid to the injection solution to effect a reaction in the ore body that produced an alkali species with higher solubility. For example U.S. Pat. No. 4,475,771 (assigned to Duval Corp.) advocated the use of hydrochloric acid, and U.S. Pat. Nos. 4,358,158 and 4,358,157 (assigned to Union Oil) encouraged the use of carbonic acid. The present invention does not require the use of acids or caustic materials for solution mining of nahcolite.

Although U.S. Pat. No. 3,779,602 (assigned to Shell Oil Company) disclosed the possible use of low pressure steam at temperatures in excess of 250° F. and preferably in excess of 300° F., published test reports indicate that the process was not successful. The Shell process, which was designed to recover oil as well as nahcolite, resulted in solids precipitation causing plugging and "flow impairment." (See, e.g., M. Prats et al. "Soluble-Salt Processes for In-Situ Recovery of Hydrocarbons From Oil Shale," *Journal of Petroleum Technology,* 1078–88 (September, 1977).) The steam caused too much fracture of the oil shale formation and had too little water content to adequately dissolve the nahcolite. Moreover, the process was designed to decompose and recover hydrocarbons from the oil shale, impurities that would make it substantially more difficult and expensive to recover soda ash and/or bicarb from the well production. Accordingly, commercial solution mining of nahcolite has traditionally been conducted at ambient or slightly elevated temperatures. For these reasons, steam is not used in the present process.

Prior to the present invention, it was generally believed that any increase in nahcolite solubility at elevated temperatures was so minimal that it did not justify the additional energy requirements associated with high temperature recovery of nahcolite. (See, Waldeck et al., "Aqueous Solubility of Salts at High Temperatures," 54 *J. Am. Chem. Society* 928 (March 1932) and Waldeck et al., "Aqueous Solubility of Salts at High Temperatures," 56 *J. Am. Chem. Society* 43 (January, 1934) which report data for the solubility of nahcolite up to 392° F.) Indeed, the Waldeck data was generally believed to be the most authoritative statement on the solubility of nahcolite and its related carbonate compounds. Surprisingly, our work has demonstrated a much higher solubility for nahcolite at temperatures above 250° F.

Figure 5:
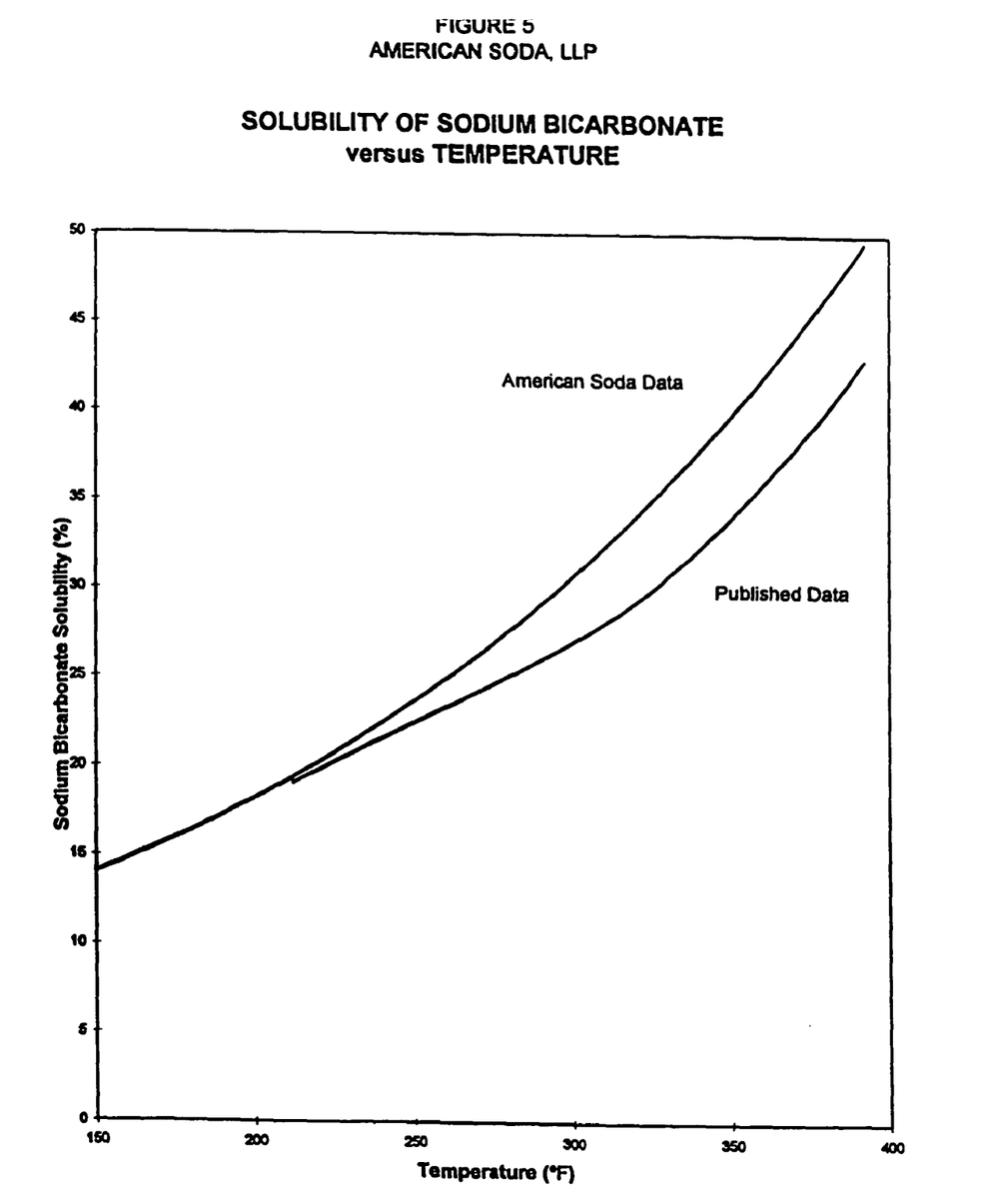
FIG. 5 is a chart showing Waldeck's published solubility of nahcolite in water compared to the solubilities we have now discovered.

It has now been discovered that the solubility of bicarb at elevated temperatures is much higher than that reported by Waldeck or predicted by extrapolating the Waldeck data above 392° F. For example, the published data indicates a solubility of about 27% for bicarb at 300° F., when in fact, the solubility is about 32% at that temperature. (The solubility percentages identified herein are based on weight.) The differences between Waldeck's published solubility information and the solubility we have found is illustrated in FIG. 5. As illustrated in FIG. 5, Waleck's solubility curve and the actual solubility curve that we have found diverge, so that at higher temperatures, the difference is even greater. This discrepancy in the published and actual solubility has been confirmed by actual solution mining tests.

This surprising discovery led to the development of the present processes which permits (through the use of higher concentrations) the more efficient mining and production of alkali from nahcolite. As used herein, the term "alkali" refers to the total sodium carbonate and sodium bicarbonate. Indeed, up to this time no one had contemplated the economical solution mining of nahcolite at the temperatures and pressures described herein.

Also, contrary to prior perceptions, it has been found that solution mining may be successfully conducted within nahcolitic oil shale intervals which contain nominally-horizontal beds of pure nahcolite and in intervals which contain both nodular and bedded nahcolite deposits. Shale fracturing can be controlled in either of these type of deposits to facilitate the solution mining of the nahcolite.

Contrary to published information (M. Prats, et al., supra), it has been found that the use of a hot aqueous phase solution mining process does not result in excessive fracturing and spalling. Solution mining of nahcolite in accordance with the present invention does not cause excessive "rubbling," i.e., disintegration of the shale rock into smaller pieces, which causes plugging of the mining cavity or the production tubing.

The present invention also utilizes pressure within the solution mining zone to prevent flashing of the mine solution, i.e., steam and carbon dioxide. Such flashing could potentially cause the decomposition of sodium bicarbonate and/or precipitation of the dissolved salts. To prevent flashing the mining zone is maintained at pressures up to the minimum hydraulic fracture pressure of the deposit being mined. This can be achieved by employing a pressurized cap of inert gas above the area of solution mining, as described more fully later, to maintain the pressure in the mining zone. Preferably, this blanket of inert gas is fed down the annulus between the injection pipe and casing. The pressure utilized for this inert gas cap is above that required to prevent flashing of the mining solution but below the minimum hydraulic fracture pressure. Alternatively, the pressure control can be accomplished by restricting the production solution flow.

Because the production solution exiting the mine is at high temperatures and pressures, the downstream processing is also novel. While some prior art processes added heat in order to decompose bicarb, the prior art did not involve high temperature and high pressure environments as used in the present invention. With the present process, the temperature of the production solution recovered from the mining zone is above that of subsequent processing and, therefore, creates much of the driving force for the decomposition. In fact, by staging the decomposition, the driving force can be spread over at least four stages in series which can include flashing, first stage decomposition, second stage decomposition, and evaporation. Bicarb decomposition occurs in all of these stages. One of the unique aspects of this processing is that three or all four stages are accomplished under pressure. "Conventional wisdom" would not consider this processing practical, since the use of high pressure would make it harder to decompose bicarb and release the carbon dioxide out of solution.

It has also been discovered that the high temperature production solution may contain a relatively large quantity of sodium carbonate without appreciably altering the total alkali being carried by the solution. Again, the prior art (such as U.S. Pat. No. 4,815,790) teaches that the concentration of sodium carbonate should be limited or controlled (i.e., by keeping temperatures below 250° F.) to facilitate dissolution of the deposit and/or to prevent downstream operational costs and other problems.

The foregoing are but a few of the differences and advantages which the present invention has exhibited over the prior art. Other objects and advantages will become apparent to one skilled in the art from the description of the invention and drawings contained herein.

III. SUMMARY OF THE INVENTION

The present invention includes a method for solution mining nahcolite, capable of extracting nahcolite from geological formations containing deposits of lean oil shale as well as beds of essentially pure nahcolite, comprising: establishing at least one well; injecting hot water via a well into the formation, so that the water has a temperature of at least 250° F. in the formation: dissolving nahcolite in the hot water to form a production solution comprising water and sodium bicarbonate; and recovering the production solution from a well.

Another aspect of the invention includes the processing of the production solution to provide sodium carbonate and, optionally, sodium bicarbonate, comprising: (a) decomposing the sodium bicarbonate portion of the hot aqueous production solution to form a hot aqueous solution of sodium carbonate; (b) evaporating water from the hot aqueous solution comprising sodium carbonate to form a concentrated solution of sodium carbonate; (c) producing sodium carbonate monohydrate from the concentrated solution of sodium carbonate by crystallization; (d) dewatering and calcining the sodium carbonate monohydrate to produce anhydrous sodium carbonate; (e) obtaining a purge stream containing sodium bicarbonate from at least one step selected from the group consisting of step (a) and step (b); (f) producing sodium bicarbonate from the purge stream by crystallization; and (g) dewatering and drying the sodium bicarbonate.

Further refinements are provided in the detailed description and drawings provided herein.

V. DETAILED DESCRIPTION OF THE INVENTION AND THE PREFERRED EMBODIMENT

The present invention is described herein as it relates to the high temperature solution mining from discontinuous deposits of nahcolite contained in the nahcolitic oil shale of the Piceance Creek Basin of Colorado. This deposit contains lenses, nodules, and the like, as well as intermixed nominally horizontal beds of nearly pure nahcolite within the host shale. The quantity of nahcolite within the Piceance Creek deposit of nahcolitic oil shale normally varies between 18% and 40% with some variation on either side of these values. This includes beds of nearly 100% pure nahcolite which normally occur in horizontal layers and much leaner deposits of nahcolite embedded in the oil shale. These "lean nahcolitic oil shale deposits," for the most part, consist of lenses and nodules of nahcolite contained within the host oil shale rock, and include those nahcolitic deposits generally classified as embedded, nodules, crystal aggregates, and disseminated. The nahcolite content of this portion of the deposit is about 17 to 37%. A significant advantage of the present invention is that it is not limited to the recovery of soda ash and bicarb from the beds of nearly pure nahcolite, but can be used to solution mine and recover these materials from the lean nahcolite deposits contained within oil shale.

Unlike prior art processes in which solution mining generally occurs laterally, i.e., horizontally, between one or more wells operating within a bed of pure nahcolite, solution mining via the present invention can be conducted vertically across a mining zone including one or more beds of pure nahcolite and/or layers of lean oil shale. In the preferred embodiment of the invention, high temperature, high pressure water (which may include recycled aqueous solution of bicarb and sodium carbonate) is injected in the top of the mining zone; the concentrated solution from the mining is recovered at a lower depth in the same well. Nahcolite is recovered from the beds of nahcolite and from the lean nahcolitic oil shale rock as the solution passes vertically downward and increases in concentration. As the mining continues, the mining area also expands laterally from the well.

While the foregoing describes a preferred mode of solution mining through a single well, the mining could also be conducted by adding the injection solution to a lower level and recovering the production solution at a higher geological elevation. Also, the addition of the injection solution and the recovery of the production solution can be alternated periodically to aid the mining process. Injection and production may also occur via different, but adjacent, wells if permitted by the formation or the stage of the solution mining in the geological formations involved.

This form of solution mining nahcolite is contrary to current thinking that discontinuities, i.e., areas of lean nahcolite concentration, in the deposit would inhibit the solution mining of the nahcolite. We have now found, however, that solution mining with water can be carried out efficiently if performed at the elevated temperatures and pressures of the present invention. There are several reasons for this: (a) the compressive strength of the host rock decreases with increasing temperatures; (b) the stress of the host rock increases with increasing temperatures; and (c) the solubility of nahcolite is far greater than originally expected at elevated temperatures.

As a result of factors (a) and (b) the introduction of high temperature water fractures the nahcolite containing oil shale. (See FIG. 4.) With rising temperatures, the strength of the host rock decreases and the stress increases—each to a point at which the two stresses become equal. At temperatures above this point, host rock breakdown (fracturing and spalling) is likely to occur. With the fracturing and spalling of the host rock, the solution mining water can reach additional soluble nahcolite nodules, lenses, and beds within the deposit.

Figure 4:
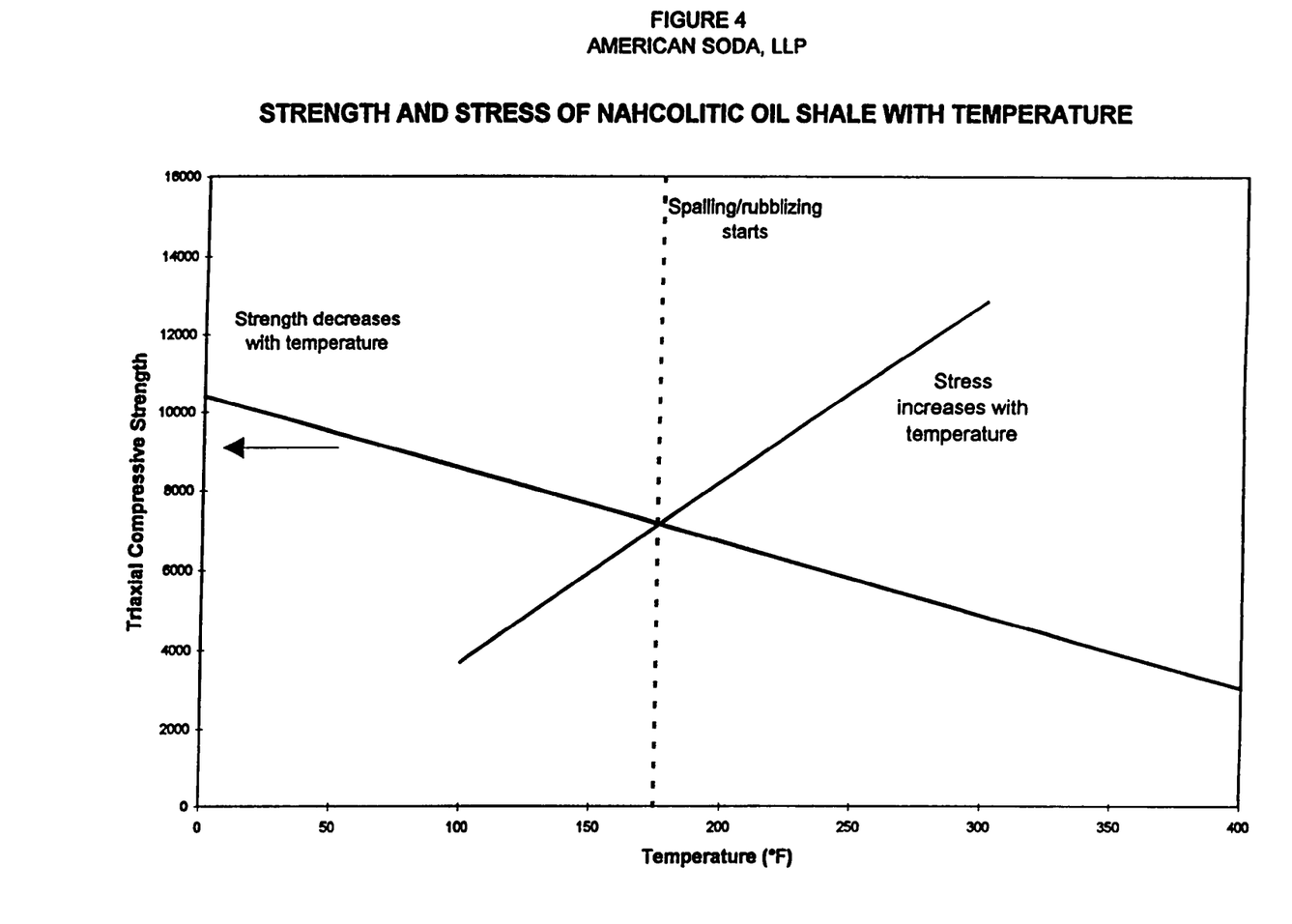
FIG. 4 show the relationship of compressive strength and stress of nahcolite oil shale with temperature.

The relationship of compressive strength and stress with temperature for one nahcolitic oil shale formation is shown in FIG. 4. At temperatures greater than about 175° F., the stress on the shale becomes greater than the capability of the shale to withstand it and fracturing and spalling occur. When the shale fractures, the lenses and nodules of nahcolite within the shale can be more readily accessed by the solution mining water. Also, both the vertical and horizontal access to nahcolite in nominally horizontal beds within the shale is increased due to the fracturing. As illustrated in FIG. 4, as higher temperatures are used for solution mining, there is greater potential for shale fracture. The temperature at which the nahcolitic oil shale in the Piceance Creek Basin will start to fracture normally occurs between 175° F. and 220° F.

The rate of solution of the soluble material within the mining zone is dependent on a number of variables including: degree of ore body fracturing, quantity of soluble material in the deposit, configuration of the soluble material in the deposit, dissolution face area, injection solution temperature, injection solution flow rate, concentration of soluble materials in the injection solution, production solution temperature, and potential soluble materials concentration in the production solution.

The quantity of nahcolite and its configuration throughout the well depth can be determined as the well is drilled. Using this information, the initial solution mining parameters may be determined for this one well. Of course, the quantity and configuration of the nahcolite may change as the mining moves away from the drilled well.

It has been found that the flow rate and temperature of the injection solution can be adjusted so as to control both the fracturing and production solution concentration. The degree of fracturing is dependent on both the injection temperature and the difference between the injection and production temperatures—in other words, the amount of heat given up by the injection solution during the solution mining. The injection temperature is the maximum temperature that any portion of the mining zone may reach, and the difference between the injection and production temperatures is a measure of how much heat is retained in the deposit surrounding the mining zone. Therefore, if more fracturing is desired, the temperature of the injection solution can be raised. For instance, if it is desired to maintain the dissolution of the same quantity of nahcolite per unit time but increase the concentration of bicarb in the production solution, the system can be changed by reducing the quantity of injection solution while, at the same time, increasing the temperature of the injection solution to maintain the original degree of heat input and fracturing in the mining zone. If it is desired to increase production rate of bicarb using the same flow rate of injection solution, the temperature of the injection solution can be increased to increase the fracturing and, therefore, the available nahcolite. With the use of high temperature water for solution mining, this method of control becomes eminently possible.

As an example, if the production solution were exiting the solution mine at 100 gpm, 300° F., and 22% bicarb with a 400° F. injection temperature, the conditions can be changed to 88 gpm and injection temperature of approximately 414° F. with the same production temperature to achieve 25% bicarb in the production solution. Conversely, with the injection rate and production temperature held constant, the injection temperature can be increased to approximately 414° F. to produce 100 gpm of production solution containing 25% bicarb.

As used herein, the following terms have the definitions indicated:

| | |
|---|---|
| Injection Solution: | The barren aqueous solution sent to the solution mine at the solution mining temperature and pressure. |
| Production Solution: | Solution recovered from the solution mining operation. |
| Mining zone(s): | The space(s) resulting from the dissolution of soluble salts into the injection solution. |
| Mining zone solution: | Solution which has been injected into the mining zone prior to recovery as production solution. |
| Flashing: | The loss of water vapor and carbon dioxide due to a system pressure less than that in equilibrium with the system temperature. |
| Tube or tubing: | Piping between the land surface and the solution mining zone that carries injection solution or production solution. |
| Casing: | Pipe through which the tubing is placed. |
| Grout: | Material within the drilled well between the casing(s) and well perimeter. |
| Nahcolite: | An ore containing primarily sodium bicarbonate (bicarb) as the water soluble salt. |
| Salt(s) | Inorganic compounds soluble in water. |

Figure 1:
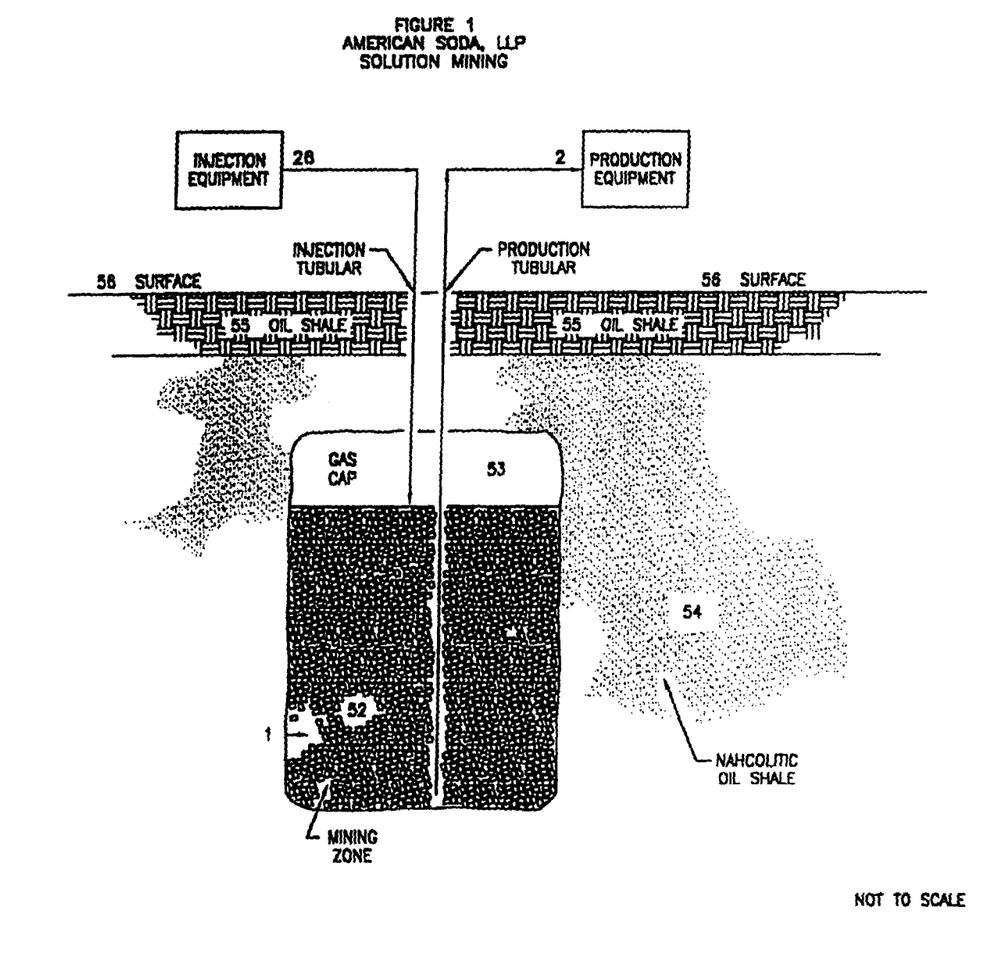
FIG. 1 is a schematic drawing showing the basic features of a preferred method of solution mining nahcolite at elevated temperatures and pressures.
Figure 2:
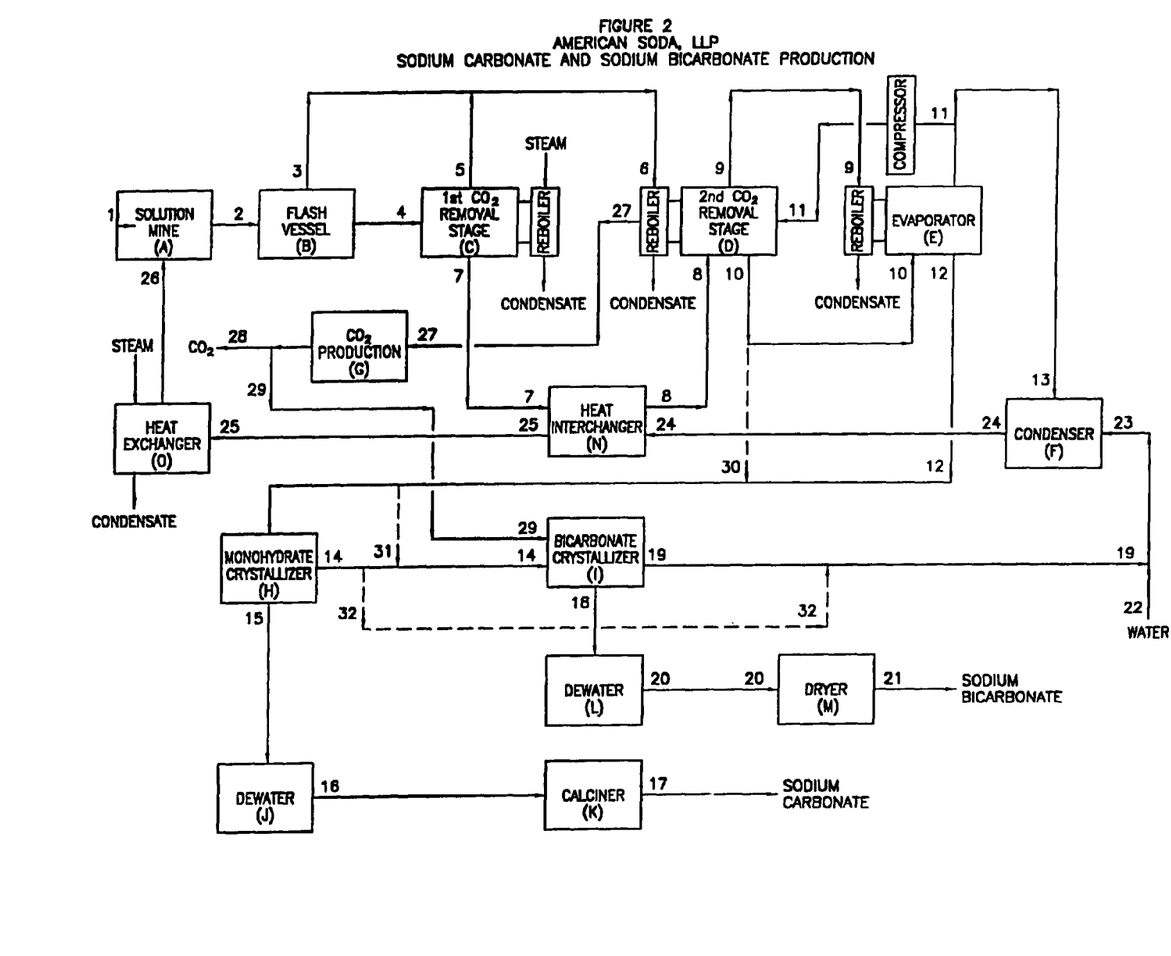
FIG. 2 is a schematic drawing showing the equipment (designated by letters) and process streams (designated by numbers) in the recovery of soda ash and bicarb from the high temperature solution mining stream.

The present invention and a preferred embodiment thereof are described herein, first, with respect to in situ solution mining (Section A; FIG. 1) and, second, with respect to the recovery of sodium carbonate and sodium bicarbonate from the production solution (Section B; FIG. 2). Examples of the present invention are provided illustrating solution mining (i.e., Example 1) and recovery of soda ash and bicarb from the production solution (i.e., Example 2).

Although the following description of the invention and the preferred embodiment are illustrated with reference to flows and operations shown in FIGS. 1 and 2, alternatives for certain process steps, equipment, and flow stream arrangements are also identified, and others may also be substituted by one of ordinary skill in the art with knowledge of the basic principles of this invention.

A. Solution Mining:

As illustrated in FIG. 1, nahcolite is dissolved at high temperatures and pressures from an underground deposit. Aqueous injection solution (26) is introduced into the solution mining zone (52) under pressure by the injection equipment with tubing extending from the surface (56) through an inert gas cap (55). Within the mining zone (52), nahcolite (1) within the nahcolitic oil shale (54) is dissolved in the aqueous mining zone solution. Production solution (2) is recovered from the mining zone and sent to the production equipment.

The ore zone of nahcolitic oil shale deposit in the Piceance Creek Basin is located 1,400 to 2,300 feet below the ground surface based on a ground elevation of 6,200 feet above mean sea level. The solution mining zone will normally be toward the bottom of the ore zone and will be 550 feet to 600 feet in depth. (See FIG. 3E where the solution mining zone is between 1,647 feet and 2,202 feet.) The ore zone contains about 18% to 40% nahcolite overall including beds of nearly pure nahcolite and lean nahcolitic oil shale. As the high temperature injection solution is introduced into the zone, fracturing and spalling of the insoluble oil shale takes place and soluble nahcolite is dissolved into the solution. The fracturing and spalling of the shale creates rubble that remains in the mining zone during the solution mining operation. Therefore, while the mined-out portion of the zone might be called a "cavity," in reality, the zone is filled with rubble. The diameter of the mining zone will vary from the diameter of the originally drilled well to over 200 feet at the completion of the mining.

In the 550 feet to 600 feet of depth of the mining zone, there are three main beds of nahcolite comprising a total of about 20–25 feet of depth. The remaining 530 to 580 feet of depth consists of nahcolite nodules surrounded by the shale. Over 87% to 90% of the nahcolite present in the deposit is in the form of nodules. The teachings of this patent illustrate a method of recovering the nahcolite in these nodules, and as a result, also the nahcolite within the beds.

The production solution (2) recovered in the solution mining of the nahcolite deposit will be between 175° F. and 550° F. Preferable ranges include 250° F. to 400° F. and, most preferable, 270° F. to 370° F. The production solution (2) will generally be between 30 psig and 700 psig, preferably 150 psig to 700 psig and, most preferably, 200 psig to 550 psig. The sodium bicarbonate content of this production solution will be between 12% and 70%, the latter being a theoretical upper limit which is difficult, if not impossible, to obtain due to the excessive pressures required to prevent flashing. In practice, the production solution will be preferably controlled between 15% and 47% and, most preferably, between 20% and 35%. The sodium carbonate concentration in the production solution is governed by the sodium carbonate content of the injection solution (26) and will usually be less than 10% and more preferably less than 5.5% by weight.

The solution mining process is operated to effect the efficient mining of nahcolite within mining zone (52) and to provide a production solution (2) that is suitable for the efficient recovery of soda ash and bicarb. To this end, the temperature in the mine solution should exceed the minimum 175° F. that causes fracturing. Use of temperatures below 250° F., however, does not provide optimum fracturing and fails to take advantage of the increased solubility of nahcolite at high temperatures. Temperatures should not exceed 550° F. at which the organic portion of the oil shale deposit may start to release hydrocarbon gases or fluids that are undesirable in soda ash and bicarb recovery.

Figure 6:
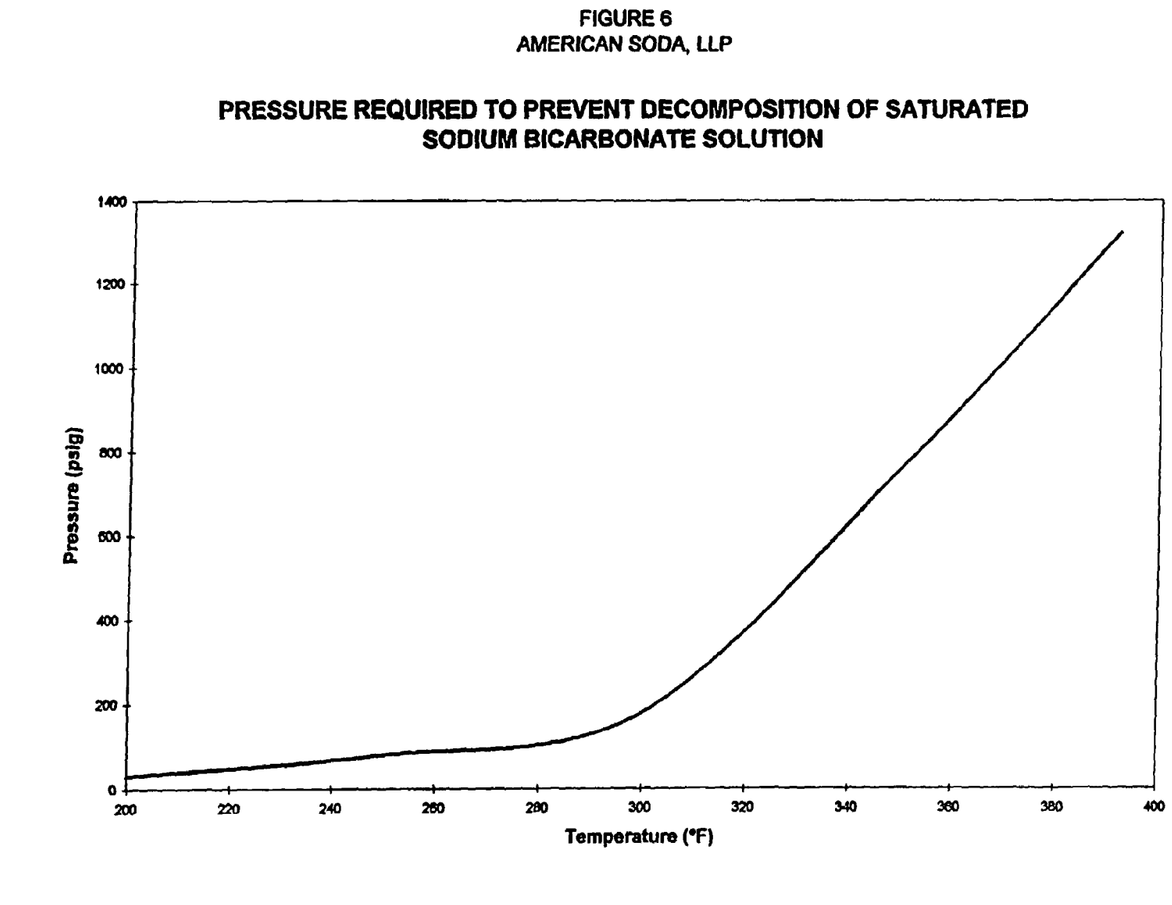
FIG. 6 is a chart showing the pressure required to prevent decomposition of saturated sodium bicarbonate in solution at various temperatures.

Solution mining, in accordance with the present invention, utilizes pressure within the solution mining zone to prevent flashing (i.e., the release of carbon dioxide and/or water vapor) within the mining zone. Such flashing could potentially cause the decomposition of sodium bicarbonate and/or precipitation of the dissolved salts. Therefore, the zone is maintained at pressures up to the minimum hydraulic fracture pressure of the deposit being mined. The minimum hydraulic fracture pressure of the nahcolitic oil shale within the Piceance Creek Basin formation is between approximately 975 psig and 1700 psig. FIG. 6 shows the pressure required to keep carbon dioxide in solution at a given temperature. The mining zone is operated at pressures above the curve shown in FIG. 6.

In addition, by maintaining a pressure within the mining zone in excess of the pressure in equilibrium with the aqueous solution temperature within the mining zone, no gas (i.e. water vapor or carbon dioxide) forms. Accordingly, there is no requirement to vent accumulated gases. The absence of gaseous carbon dioxide minimizes corrosion within the production tubing. The mining zone pressure is monitored by noting the pressure of the inert gas blanket (53).

The injection solution pressure required is that necessary to overcome the piping friction to and from the mining zone, the mining zone resistance, and the specific gravity influence between the injection and production solutions, plus a pressure greater than that required to prevent flashing between the injection equipment and the production equipment. By supplying an injection pressure of this magnitude, there is no need for a gas lift system in the production tubing to recover mining solution. By not introducing gas lift into the system, an additional favorable attribute results. Corrosion within the production tubing is less severe due to single phase flow and the absence of water vapor and carbon dioxide in a gas phase.

The aqueous injection solution may contain soluble salts, e.g. sodium bicarbonate, sodium carbonate, sodium chloride, etc. These salts may be contained in the injection solution due to the purging and recycling of solutions into the injection solution from systems recovering alkali from the production solution. Concentrations of sodium bicarbonate and sodium carbonate may be as high as 10% each. Of course, the dissolving potential of the injection solution is reduced if it contains soluble salts.

Injection equipment, such as, an injection pump(s) capable of supplying the pressure are required. The production equipment can include booster pumps to impart any extra pressure required to prevent flashing prior to production solution processing. Alternately, a booster pump(s) may be of the submerged type and may be placed at any point within the production tubing or return piping.

The design of the solution mining wells is very important, due to the high pressures of the injection and production solutions and the requirement to transfer large amounts of heat efficiently to the nahcolite containing shale oil deposit. (FIGS. 3A through 3E.) Each solution mining well drilled must include a seal (i.e., "grout") to prevent intrusion of ground water into the annulus between the casing and ground. The grout seals the mining zone from the surface, prevents ground water from reaching the surface, prevents ground water from entering the solution mining zone, prevents ground waters from intermixing, and prevents solution mining solutions from mixing with ground water. Accordingly, the grout preferably extends continuously from the surface level to the top of the deposit being mined.

For the solution mining, as described herein, where the temperatures of the solutions are above the atmospheric boiling point, it is imperative that the grout construction include insulating properties for energy conservation and the maintenance of the high solution mining temperatures. Therefore, the composition of the grout material is extremely important. It has been found that the grout may consist of cement with perlite, fly ash, coal clinker, oil shale clinker, light weight aggregate, spherelite, or other insulating filler; urethane based material; or other material of the proper strength and consistency(s) to completely seal the annulus and provide good insulating properties. The thickness of the grout between the casing and the surrounding rock is also important and is determined by the insulating quality of the grout material and the heat loss that can be tolerated. A typical grout may consist of 34% cement, 33% silica flour, and 33% spherelite beads.

In order to accomplish the high temperature solution mining, the tubing configuration is also important. With improper tubing design, heat may be lost to the surrounding rock and/or to other tubing members.

Figure 3A:
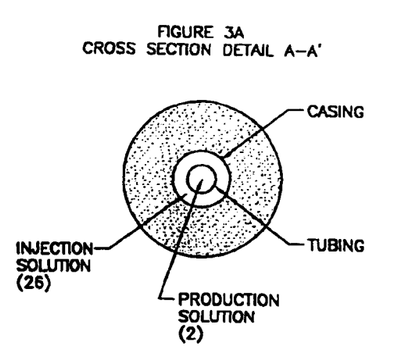
FIGS. 3A through 3E illustrate pipe or tubing configurations that can be used in the solution mining processes of the present invention.
Figure 3B:
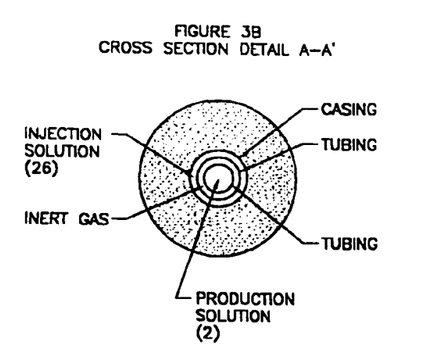
Figure 3C:
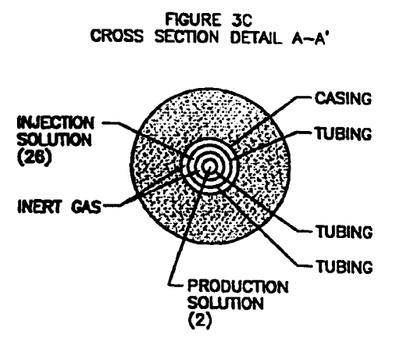
Figure 3D:
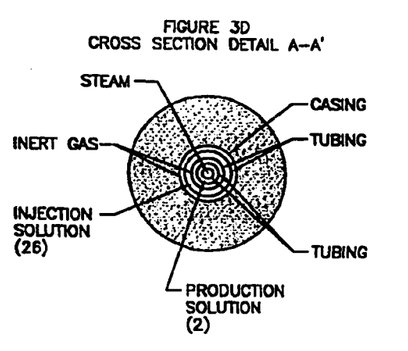

The most simple means of accomplishing the transfer of solution from the surface to the solution mining zone and return to the surface is by two concentric pipes. (FIG. 3A.) This is certainly a method that can be used in the solution mining of nahcolite. The injection solution can be in either the center pipe or in the outside pipe with the latter configuration being the more desirable since the concentrated production solution will be less likely to lose heat and precipitate sodium bicarbonate. The drawback to the two pipe system is that the injection solution is cooled as it flows to the mining zone, thereby, causing less oil shale fracturing and less sodium bicarbonate solubilization.

A more preferable tubing configuration is to provide three (FIG. 3B), four (FIG. 3C), or five (FIG. 3D) concentric pipe configurations. For a three pipe configuration, the center pipe would carry the production solution, the annular space between the center pipe and outside pipe would contain an inert gas consisting or nitrogen, helium, hydrogen, methane, or the like. This would provide insulation between the outside pipe carrying the injection solution and the production solution. This configuration is better than the two-pipe configuration as the temperature of the injection solution is higher when it reaches the mining zone. Greater mining zone temperatures result in greater oil shale fracturing and greater water-soluble salt concentrations in the production solution. However, with the three-pipe configuration, some heat would be lost from the injection solution to the grout.

The four-pipe configuration (FIG. 3C) is similar to the three-pipe configuration except that an additional inert gas insulating pipe is provided between the injection solution pipe and the grout, thus reducing the amount of heat lost to the ground and aquifers through the grout. Another configuration would include a fifth pipe inside the production solution pipe (FIG. 3D) that would carry steam or hot water to insure that the production solution did not cool to the point of crystal precipitation as it rose to the surface.

Figure 3E:
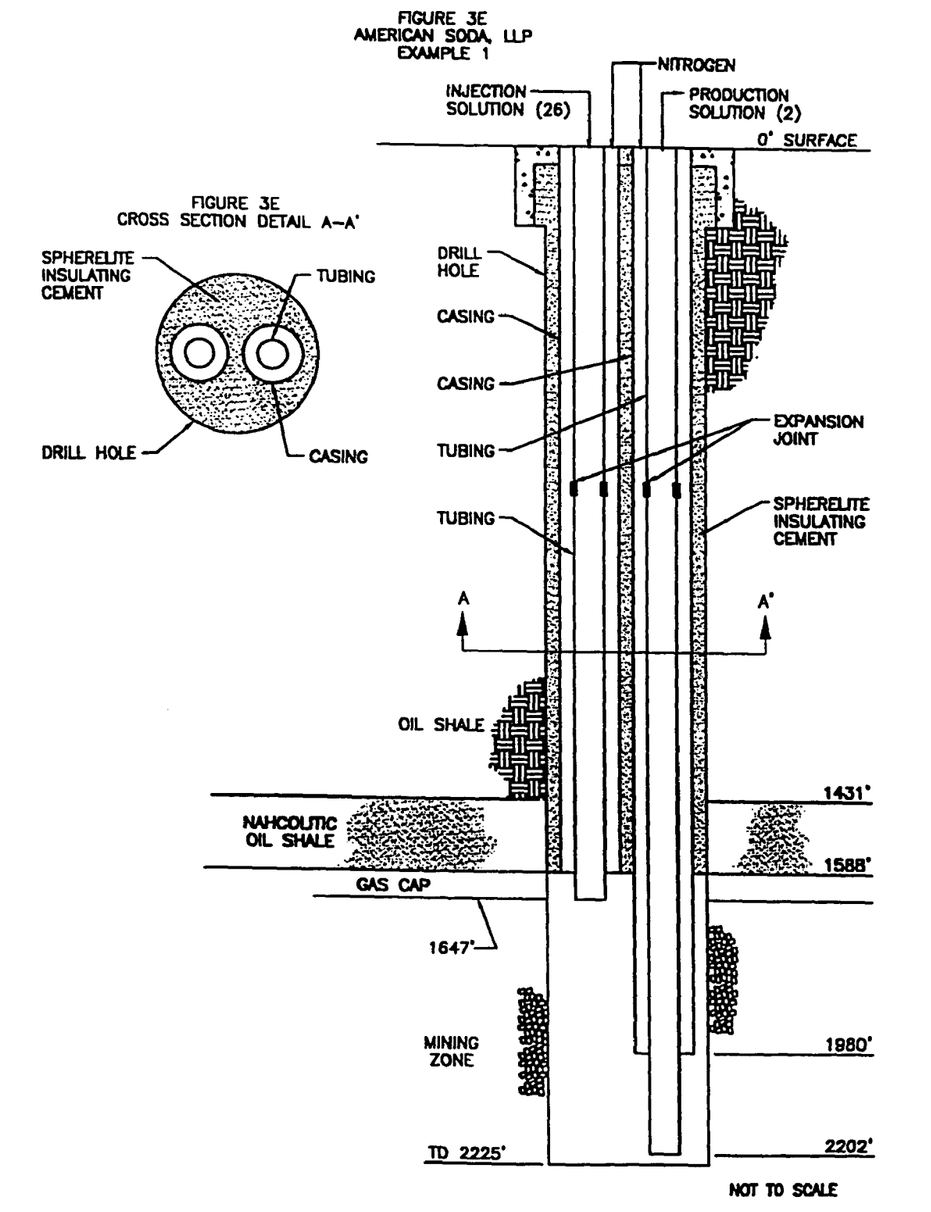

Additionally, the injection and production tubing may be separated. (FIG. 3E.) The injection pipe is contained within a pipe (casing) containing an insulating gas; both, of which, are contained in a grout. The production pipe is contained within a pipe (casing) containing an insulating gas; both, of which, are contained in the same grout as the injection tubing. Again, a pipe containing steam or hot water may be included within the production pipe.

Depending on the stresses of the tubing due to temperature, length, and pipe specifications, one or more expansion joints may be included in each tubing.

All of the above described well descriptions are designed to prevent heat loss as the injection and production solutions move through the well.

The upper mining zone limit as well as the shape of the mining zone, to some extent, is controlled by the use of a nitrogen gas pad. However, any inert gas will work. "Inert gas" is defined as one that will not react with the well solution at the design temperature and pressure. Gases that could be used (but not limited to) are nitrogen, helium, hydrogen, methane, carbon dioxide, and others. The gas pad volume (height) is controlled by injecting or removing gas from the mining zone through the gas annulus surrounding the injection solution pipe.

B. Recovery of Bicarb:

An advantage of the solution mining process of the present invention is that it provides a production solution that is free of impurities, such as, organics (e.g., oil and other hydrocarbons) and containing minimal amounts of salt, i.e., sodium chloride. Accordingly, processing of the production solution to produce soda ash and bicarb does not require preliminary procedures to remove these impurities, e.g., solids filtration and carbon absorption treatments. In contrast to prior art processes, the present invention is capable of producing an essentially clear production solution free of solids.

As shown in FIG. 2, the production solution (2) is processed for the recovery of soda ash and bicarb. In order to prevent any flashing in the production solution piping prior to the first carbon dioxide flash vessel (B) thus creating a potential of piping system plugging and/or erosion, the pressure of the production solution (2) is maintained higher than that which would result in flashing. Normally, this pressure is significantly higher than that in the first stage carbon dioxide removal (C).

The production solution (2) is fed to a flash vessel (B) which is held at a pressure equal to or above the pressure of the first carbon dioxide removal stage (C). The flashing which occurs in the flash vessel results in the release of a significant quantity of vapor (3) containing water vapor and carbon dioxide, and a liquid stream (4). The flashed vapor can join the vapor from the first carbon dioxide removal stage (C) or can be used for other purposes, such as, preheating the injection solution.

By releasing this large volume of vapor prior to entering the first carbon dioxide removal stage (C), the size of this first stage equipment can be minimized resulting in less capital cost. Operational problems (e.g., flooding) are also minimized. As an alternative to using a separate flash vessel (B), the production solution (2) may be fed into an enlarged section of the first carbon dioxide removal stage where the flashing preferentially occurs.

The first carbon dioxide removal stage (C) can utilize a simple evaporator, which will also decompose the bicarb. Most usually, however, this step will be accomplished by a steam stripping unit because of the efficient removal of carbon dioxide associated with this type of unit. Steam from a boiler can be directly injected into the steam stripping unit, but more preferably will be utilized in the reboiler of the first carbon dioxide removal stage (C) to provide the energy and stripping requirements for the carbon dioxide removal.

In the preferred configuration two or more stages of stripping are utilized for efficient energy utilization. In the preferred embodiment shown in FIG. 2, two stages (C) and (D) are utilized. Steam (5) from the first stage plus flashed vapor (3) is used as reboiler steam (6) for the second stage and so forth. In order for this to occur without the aid of a compressor, the first stage is operated at a higher pressure (30 to 400 psig., but preferably 50 to 110 psig, e.g., 90 psig) and temperature (250 to 450° F., but preferably 270 to 340° F.) than the second stage. And, in fact, it is appropriate for the second stage (D) to operate under pressure as the steam from this stage can then be utilized in subsequent stages or a downstream evaporator.

Vapor (5) from the first carbon dioxide removal stage (C), containing water vapor and carbon dioxide most usually will join with the vapor (3) from the flash vessel (B), with the combined vapor stream (6) being used to provide a portion of the steam required for the second carbon dioxide removal stage (D). The vapors stream (3) and (5) need not be joined if there is an economic or other benefit to their being utilized independently, e.g., preheating the injection solution.

The second carbon dioxide removal stage (D) is operated at a lower pressure (0 to 300 psig, but normally 5 to 30 psig), and therefore, a lower temperature (200 to 400° F., but normally 220 to 250° F.) than the first carbon dioxide removal stage. The vapor streams (3) and (5), therefore, can flow to the reboiler of the second removal stage and be utilized as a heating means for that stage. The second carbon dioxide removal stage can be an evaporator or more preferably a steam stripping unit. Steam from a boiler can also be utilized directly or indirectly in this second removal vessel as the sole source of carbon dioxide removal energy or may be used in conjunction with the vapor streams from the flash vessel and first carbon dioxide removal stage. This steam can be directly injected into the second removal stage and/or introduced into a reboiler. If the bicarb content of the production solution is greater than about 34%, water may have to be added to the carbon dioxide removal stages to prevent the precipitation of soda ash.

By choosing the operating pressures and temperatures of the first and second carbon dioxide removal stages, one or more additional removal stages may be included in series, operating with the same vapor paths as described in the previous paragraph, and result in even greater energy efficiencies.

The bicarb concentration in the solution (10) exiting the last carbon dioxide removal stage (D) should be 2.5% or less but most preferably less than 1.0%. Depending on the alkali concentration in the well production solution, the soda ash content of this exiting solution will be 6.7% to 30%, but more usually 12% to 27%.

Solution (10) from the second carbon dioxide removal stage may be sent to the product recovery steps of the process (30) or may be sent to a further evaporation step (E) if the concentration in the second carbon dioxide removal stage solution discharge is less than saturated with the alkali (bicarb plus soda ash) components. The advantage to this evaporation step is to efficiently utilize the vapor generated in the second carbon dioxide removal stage. The pressure, and therefore, the temperature of this further evaporation step will be lower than that of the second removal stage allowing the vapor (9) from the second removal stage to be utilized to provide indirect heating for the evaporation.

If an evaporation vessel is utilized in preparing the solution for product recovery, it may be of any of many well known evaporator designs, but in the present embodiment, is of the falling film type. Vapor (9) from the second carbon dioxide removal stage is used to indirectly heat the evaporator. Vapor (11) from the evaporator (E) is sent as stripping steam to the second removal stage (D) via a mechanical compressor. Since this stream contains some carbon dioxide, a purge (13) is used to preheat solution 23 being sent to the mine via indirect or direct contact heat interchange (F).

Another attribute of this innovative process is that essentially pure carbon dioxide (28) is produced by drying the vent stream (27) from the second carbon dioxide removal stage reboiler in carbon dioxide production unit (G). This carbon dioxide can be used in a subsequent bicarb production step (I) and/or marketed as a byproduct of the process.

By selecting the pressures of the flash vessel (B), the first carbon dioxide removal stage (C), the second carbon dioxide removal stage (D), and the evaporator (E), an efficient energy utilization is attained. Further, by utilizing steam sources in the order described, each stage can accomplish an efficient removal of carbon dioxide from the system based on the carbon dioxide content of the solutions and the vapors. This is all made possible by the high temperatures and pressures of the production solution from the solution mine. So, not only is the mining of nahcolite extremely efficient due to the high pressures and temperatures, the downstream processing is also extremely efficient, particularly with respect to energy consumption.

Solution (12) exiting the evaporator (E) normally contains about 27% to 30% soda ash. It is sent to product recovery units. Since the bicarb has been substantially removed from this solution, standard materials of construction may be used for subsequent piping and equipment. Also, since subsequent operations in this process are not connected with the energy recovery or carbon dioxide recovery systems of the operations previously described, the subsequent operations may be some distance away.

Evaporator discharge solution (12) may be sent to a sodium carbonate monohydrate ("mono") crystallization system (H) and/or to a bicarb crystallizer (I) via stream (31). The mono crystallizer system may be of any of the many designs known to the industry, such as multiple effect or mechanical vapor recompression (MVR) types. The crystallized mono (15) is dewatered in step (J) and the dewatered mono (16) calcined in step (K) to produce soda ash (17)

Since the evaporator discharge solution may contain impurities, the mono crystallization system may have to be purged (14) in order to a maintain high quality soda ash. This purge (14) may be fed alone or together with a portion of the evaporator solution (31) to a bicarb crystallizer (I). This actually is a benefit of this process in that there will be no undue increase of sodium bicarbonate concentration in the mono crystallizer.

Solution (14), containing predominately sodium carbonate solution (up to 30%) with some sodium bicarbonate monhydrate crystals (0% to 3%) and some sodium bicarbonate (0% to 4%), is fed to the bicarb crystallizer. Carbonation (29) is introduced and carried out concurrently with the cooling. By maintaining the proper supersaturation and crystal density in the crystallizer (I), a crystal size distribution equal to commercial grade specifications is produced. Bicarb (18) produced in the bicarb crystallizer is dewatered (L) and dried (M) to produce dried sodium bicarbonate (21).

Some, none, or all of the mono crystallization system purge (32) and bicarb crystallization purge (19), along with makeup water comprises the injection solution for the solution mining of the nahcolite. Prior to addition to the well field, this solution (23) can be heated through the use of various streams in the facility. In the preferred embodiment, stream (19) is combined with make-up water (22) to produce combined stream (23) which is heated in condenser (F) by stream (13) and the heated stream (24) is further heated in heat interchanger (N) by stream (7) to produce heated stream (25). Heated stream (25) is brought to the final injection temperature (preferably 300° F. to 450° F.) with steam in heat exchanger (O).

A real advantage to this process is that the mono and bicarb purges from the crystallizers may be recycled to the wells. The overall buildup of impurities, notably sodium chloride, will stabilize at a point not detrimental to the process or to the quality of the products. As water replaces the dissolved nahcolite in the mining zone, sodium chloride from the deposit is retained in that liquid. The soda ash concentration in the injection solution (26) will preferably be 0 to 5.5%, and the bicarb concentration will usually be 0 to 5%.

VI. EXAMPLES

Example 1

This example illustrates the high temperature solution mining of nahcolite.

The techniques described herein are utilized effectively in the solution mining of nahcolite from the nahcolitic oil shale deposits in the Piceance Creek Basin of western Colorado. These deposits, for the most part, consist of lenses and nodules of nahcolite contained within an oil shale host rock. The nahcolite content of this portion of the deposit is 18% to 40%. There are also several, nominally-horizontal beds of varying thickness of nahcolite within the deposit.

A well is drilled into a nahcolitic oil shale, as shown in FIG. 3E, with the mining zone extending from 1647 feet below the ground surface (where injection solution is inserted into the formation) to 2202 feet (where the production solution is recovered), i.e., a vertical separation of 555 feet. The average nahcolite concentration over the mining zone is 22%, of which, 91.2% is contained in nodules within the oil shale and 8.8% is contained in beds. The total depth of the three beds within the mining zone is about 21 feet.

When a 400° F. aqueous solution (26) is injected into the deposit, not only will the hot solution be able to carry high concentrations of bicarb, the shale within the deposit will fracture and spall so as to render additional nahcolite available for dissolution.

For this example, the configuration of the injection and production piping consists of an injection pipe contained within a pipe (casing) containing a nitrogen gas; both, of which, are contained in a spherelite-cement grout, as identified previously, extending the full length of the well. The production pipe is contained within a pipe (casing) containing a nitrogen gas; both, of which, are contained in the same grouted well as the injection piping. (See FIG. 3E.) Nitrogen gas injected through the annulus of the injection pipe is used to form a gas blanket of approximately 60 foot gas blanket above the mining zone.

A mining field is established with thirteen wells as described above. Injection solution (26), at 667 tph and containing approximately 2.2% soda ash and 1.3% bicarb at 400° F. and 711 psia, is introduced into the injection piping for the thirteen wells at the surface. This injection solution flows through the injection pipe to the top of the mining zone, flows downward through the mining zone to the production pipe intake, and through the production solution pipe to the surface (2), and thence to solution processing as described in Example 2.

As the solution flows downward through the mining zone, a portion of its heat is utilized to fracture the oil shale, a portion of the heat is also lost as the solutions travels to and from the mining zone (circa 2° F.), and a portion is lost as the nahcolite is dissolved (circa 2° F.). Most of the heat content is retained in the solution to insure the dissolved bicarb will remain so. A production solution (2) containing 25% bicarb is recovered from the operation at 300° F. in the mining zone. The following table shows the material balance for the indicated streams:

|  | Flow Rate (tph) | | | |
| --- | --- | --- | --- | --- |
|  | Total | Soda Ash | Bicarb | Water |
| Injection Solution (26) | 667 | 15 | 9 | 643 |
| Leached from Deposit (1) | 184 | — | 184 | — |
| Retained Soluton | 85 | 2 | 1 | 81 |
| Production Solution (2) | 767 | 13 | 192 | 562 |

As the nahcolite (bicarb) is dissolved, the volume originally occupied by the bicarb is replaced by solution. Therefore, as 184 tph of bicarb is dissolved (1), 85 tph of solution takes its place.

The fact that the heat carried by the injection solution for this example was enough to fracture the nahcolitic oil shale to the extent that a production solution containing 25% bicarb was produced does not mean that the same heat input into another well having the same characteristics will result in an identical bicarb concentration in the production solution. The shale and nahcolite nodules may be arranged differently. Each well will have its own heat input/bicarb production concentration characteristics.

Example 2

This example illustrates the recovery process shown in FIG. 2.

In this example, 767 tph of production solution (2) is recovered from the solution mining wellfield containing thirteen wells at 300° F. and 300 psia. With proper wellfield management, this solution contains at least 192 tph of sodium bicarbonate (bicarb). The sodium carbonate content is a function of the sodium carbonate in the injection solution less the quantity in the solution retained in the solution mined zone. In this example, the sodium carbonate content is 13 tph.

The production solution is fed to the flash vessel (B) operating at 90 psia pressure. Quantities of solution (4) and vapor (3) from this vessel are as shown in the following table.

Solution (4) from the flash vessel is fed to a first steam stripping column (C) which is also operated at 90 psia. Steam from the column reboiler is utilized to decompose a portion of the bicarb and then to strip the resulting carbon dioxide. Saturated steam, at 350 psig and amounting to about 67 tph, is utilized in the reboiler to generate the stripping steam. Additionally, miscellaneous steam flashed from various condensate receivers, amounting to about 18 tph, is introduced as stripping steam into the column. The temperatures in this column vary from 283° F. at the top to 325° F. at the bottom.

Vapor (5) from the first stripping column (C) combines with the flash vessel vapor (3) and flows (6) to the reboiler of a second stripping column (D). Steam from this reboiler, from a subsequent evaporator mechanical vapor recompressor, and from miscellaneous flashed steam totaling about 232 tph is injected into this second stripping column (D) to further decompose bicarb and strip the resulting carbon dioxide. This column is operated at 21.5 psia. Temperatures of this column range from 231° F. at the top to 237° F. at the bottom.

Solution (7) from the first stripping column (C) after flowing through an injection solution preheating system is fed (8) to the top of the second stage stripping column (D). The quantities and compositions of this solution and the solution exiting the second stage stripping column are shown on the following table.

An evaporator operating at 14.9 psia and 220° F. follows the stripping operation. Vapor from the second stripping column (9) along with miscellaneous flashed steam totaling about 246 tph is fed to the reboiler of this evaporator. Solution (10) exiting the second stripping column (D) is fed to the body of the evaporator.

Vapor (11) exiting the evaporator (E) is compressed by mechanical vapor recompression and sent to the reboiler of the second stage column as described earlier. Solution (12) exiting the evaporator (E), the quantity and composition of which are included in the following table, is sent to either the sodium carbonate crystallizer or the bicarb crystallizer.

For this example, it is assumed that the evaporator discharge solution would be split so as to produce 101 tph of sodium carbonate (17) from the evaporator discharge solution; and 19 tph of bicarb (21) from a combination of evaporator discharge solution (31) and sodium carbonate crystallizer purge (14).

Bicarb crystallizer purge (19) and water makeup (22) totaling 476 tph is used to condense 51 tph vapor purged from the evaporator (13) and is then sent along with 140 tph of process condensate through a series of heat reclaiming exchangers. The temperatures of the solution before the vapor condenser, before the heat exchangers, and after the exchangers are 144° F., 222° F., and 304° F., respectively. Following a final heat exchanger utilizing steam, the injection solution (26) temperature reaches 435° F.

The quantity and composition of each of the flow streams indicated is shown in the following table:

|  | Flow Rate (tph) | | | | |
| --- | --- | --- | --- | --- | --- |
|  | Total | Soda Ash | Bicarb | Water | Carbon Dioxide |
| Production Solution (2) | 767 | 13 | 192 | 562 | — |
| Flash Discharge Sol'n (4) | 747 | 45 | 141 | 561 | — |
| Flash Vapor (3) | 20 | — | — | 6 | 14 |
| 1st Stripper Discharge (7) | 707 | 120 | 21 | 566 | — |
| 2nd Stripper Discharge (10) | 695 | 126 | 12 | 557 | — |
| Evaporator Discharge (12) | 474 | 128 | 9 | 337 | — |
| Soda Ash Product (17) | 101 | 101 | 0 | 0 | — |
| Bicarb Product (21) | 19 | 0 | 19 | 0 | — |
| Injection Solution (26) | 667 | 15 | 9 | 643 | — |

We claim:

1. A process for the recovery of anhydrous sodium carbonate from a hot aqueous solution containing sodium bicarbonate comprising:
    decomposing the sodium bicarbonate portion of the hot aqueous solution to form a hot aqueous solution comprising sodium carbonate, wherein the hot aqueous solution containing sodium bicarbonate is at a pressure sufficient to prevent the flashing of carbon dioxide;
    evaporating water from the hot aqueous solution comprising sodium carbonate to form a concentrated solution of sodium carbonate;
    producing sodium carbonate monohydrate from the concentrated solution of sodium carbonate by crystallization; and
    dewatering and calcining the sodium carbonate monohydrate to produce anhydrous sodium carbonate.

2. The process of claim 1 wherein the hot aqueous solution containing sodium bicarbonate is essentially clear, is essentially free of solids and organics, and contains a minimal amount of salt.

3. The process of claim 1 wherein the hot aqueous solution containing sodium bicarbonate is obtained from the solution mining of nahcolite with a hot aqueous liquid at a temperature of at least 250° F.

4. The process of claim 1 wherein the decomposition of the sodium bicarbonate in the hot aqueous solution occurs in one or more stages.

5. The process of claim 4 wherein the solution from the sodium bicarbonate decomposition contains 0% to 2.5% sodium bicarbonate.

6. The process of claim 4 wherein the solution from the sodium bicarbonate decomposition contains 6.7% to 30% sodium carbonate.

7. The process of claim 4 wherein the solution from the sodium bicarbonate decomposition contains from 12% to 27% sodium carbonate.

8. The process of claim 4 wherein water is added during the sodium bicarbonate decomposition to maintain a solution below the sodium carbonate crystallization concentration.

9. The process of claim 7 wherein the solution with sodium carbonate is fed to an evaporator.

10. The process of claim 9 wherein the evaporator further concentrates the solution to between 25% to 30% sodium carbonate.

11. The process of claim 9 wherein the vapor from the sodium bicarbonate decomposition is used, at least partially, to heat the evaporator.

12. The process of claim 9 wherein the vapor from the evaporator is used, at least partially, as stripping steam in the sodium bicarbonate decomposition step.

13. The process of claim 6 wherein the resulting concentrated solution from the evaporator is sent to the crystallizer and the crystallizer comprises a device selected from the group consisting of multiple effect and MVR crystallizers.

14. A process for the recovery of anhydrous sodium carbonate from a hot aqueous solution containing sodium bicarbonate comprising:
    decomposing the sodium bicarbonate portion of the hot aqueous solution by steam stripping at the equilibrium steam temperature for the pressure of the decomposition to form a hot aqueous solution comprising sodium carbonate:
    evaporating water from the hot aqueous solution comprising sodium carbonate to form a concentrated solution of sodium carbonate;
    producing sodium carbonate monohydrate from the concentrated solution of sodium carbonate by crystallization; and
    dewatering and calcining the sodium carbonate monohydrate to produce anhydrous sodium carbonate.

15. The process of claim 14 wherein the decomposition of the sodium bicarbonate is carried out by two stages of steam stripping.

16. The process of claim 15 wherein the first stage of steam stripping is carried out at a higher pressure and temperature than the second stage.

17. The process of claim 15 wherein the pressure of the first stage of steam stripping is 30 psig to 400 psig.

18. The process of claim 15 wherein the pressure of the first stage of stream stripping is 50 psig to 110 psig.

19. The process of claim 15 wherein the temperature of the first stage of steam stripping is 250° F. to 450° F.

20. The process of claim 15 wherein the temperature of the first stage of steam stripping is 270° F. to 340° F.

21. The process of claim 15 wherein the temperature of each stage of stripping is carried out at the equilibrium steam temperature at the pressure in that stage.

22. The process of claim 15 wherein the vapor from the first stage of steam stripping is utilized to supply part of heat for the second stage of steam stripping.

23. The process of claim 14 wherein the decomposition of the sodium bicarbonate is carried out with more than two stages of steam stripping with the temperature and pressure of each stage being such that the vapor from at least one prior stage can be utilized in the reboiler of a subsequent stage.

24. The process of claim 14 wherein the decomposition of sodium bicarbonate is carried out with concurrent evaporation.

25. The process of claim 14 wherein the decomposition of the sodium bicarbonate is accomplished in part by flashing in an enlarged part of the first vessel utilized for steam stripping.

26. The process of claim 14 wherein the solution from the sodium bicarbonate decomposition contains 0% to 2.5% sodium bicarbonate.

27. The process of claim 15 wherein the solution from the sodium bicarbonate decomposition contains 0% to 2.5% sodium bicarbonate.

28. The process of claim 23 wherein the solution from the sodium bicarbonate decomposition contains 0% to 2.5% sodium bicarbonate.

29. The process of claim 24 wherein the solution from the sodium bicarbonate decomposition contains 0% to 2.5% sodium bicarbonate.

30. The process of claim 14 wherein at least a portion of the carbon dioxide in the vapor stream from the steam stripping is recovered as a byproduct.

31. A process for the recovery of anhydrous sodium carbonate from a hot aqueous solution containing sodium bicarbonate comprising:

decomposing the sodium bicarbonate portion of the hot aqueous solution in one or more stages to form a hot aqueous solution comprising sodium carbonate, wherein the decomposition of the sodium bicarbonate is accomplished in part by flashing prior to steam stripping;

evaporating water from the hot aqueous solution comprising sodium carbonate to form a concentrated solution of sodium carbonate;

producing sodium carbonate monohydrate from the concentrated solution of sodium carbonate by crystallization; and dewatering and calcining the sodium carbonate monohydrate to produce anhydrous sodium carbonate.

32. The process of claim 31 wherein the pressure of the flashing is the same as the first stage of steam stripping.

33. The process of claim 31 wherein the vapor from the flashing stage is combined with the vapor from the first stage of decomposition and is utilized to provide heat for a subsequent stage of decomposition.

34. A process for the recovery of anhydrous sodium carbonate and sodium bicarbonate from a hot aqueous solution comprising sodium bicarbonate comprising:

a. decomposing a portion of the sodium bicarbonate in the hot aqueous solution to form a hot aqueous solution comprising sodium carbonate;

b. evaporating water from the hot aqueous solution comprising sodium carbonate to form a concentrated solution of comprising sodium carbonate;

c. producing sodium carbonate monohydrate from the concentrated solution of comprising sodium carbonate by crystallization;

d. dewatering and calcining the sodium carbonate monohydrate to produce anhydrous sodium carbonate;

e. obtaining a purge stream containing sodium bicarbonate from at least one procedure selected from the group consisting of procedure a, procedure b and procedure c above;

f. producing sodium bicarbonate from the purge stream by crystallization; and g. dewatering and drying the sodium bicarbonate.

35. The process of claim 34 wherein the hot aqueous solution containing sodium bicarbonate is essentially clear, is essentially free of solids and organics and contains a minimal amount of salt.

36. The process of claim 34 wherein the hot aqueous solution containing sodium bicarbonate is obtained from the solution mining of nahcolite with a hot aqueous liquid at a temperature of at least 250° F.

37. The process of claim 34 wherein the hot aqueous solution containing sodium bicarbonate is at a pressure sufficient to prevent the flashing of carbon dioxide.

38. The process of claim 34 wherein the decomposition of the sodium bicarbonate in the hot aqueous solution occurs in one or more stages.

39. The process of claim 34 wherein the decomposition of the sodium bicarbonate in the hot aqueous solution is carried out by steam stripping.

40. The process of claim 39 wherein the decomposition of the sodium bicarbonate is carried out at the equilibrium steam temperature for the pressure of the decomposition.

41. The process of claim 39 wherein the decomposition of the sodium bicarbonate is carried out by two stages of steam stripping.

42. The process of claim 41 wherein the first stage of steam stripping is carried out at a higher pressure and temperature than the second stage.

43. The process of claim 41 wherein the pressure of the first stage of steam stripping is 30 psig to 400 psig.

44. The process of claim 41 wherein the pressure of the first stage of stream stripping is 50 psig to 110 psig.

45. The process of claim 41 wherein the temperature of the first stage of steam stripping is 250° F. to 450° F.

46. The process of claim 41 wherein the temperature of the first stage of steam stripping is 270° F. to 340° F.

47. The process of claim 41 wherein the temperature of each stage of stripping is carried out at the equilibrium steam temperature at the pressure in that stage.

48. The process of claim 41 wherein the vapor from the first stage of steam stripping is utilized to supply part of heat for the second stage of steam stripping.

49. The process of claim 39 wherein the decomposition of the sodium bicarbonate is carried out with more than two stages of steam stripping with the temperature and pressure of each stage being such that the vapor from a least one prior stage can be utilized in the reboiler of a subsequent stage.

50. The process of claim 38 wherein the decomposition of sodium bicarbonate is carried out with concurrent evaporation.

51. The process of claim 39 wherein the decomposition of the sodium bicarbonate is accomplished in part by flashing prior to steam stripping.

52. The process of claim 39 wherein the decomposition of the sodium bicarbonate is accomplished in part by flashing in an enlarged part of the first vessel utilized for steam stripping.

53. The process of claim 51 wherein the pressure of the flashing is the same as the first stage of steam stripping.

54. The process of claim 51 wherein the vapor from the flashing stage is combined with the vapor from the first stage of decomposition and is utilized to provide heat for a subsequent stage of decomposition.

55. The process of claim 38 wherein the solution from the sodium bicarbonate decomposition contains 0% to 2.5% sodium bicarbonate.

56. The process of claim 39 wherein the solution from the sodium bicarbonate decomposition contains 0% to 2.5% sodium bicarbonate.

57. The process of claim 41 wherein the solution from the sodium bicarbonate decomposition contains 0%/a to 2.5% sodium bicarbonate.

58. The process of claim 49 wherein the solution from the sodium bicarbonate decomposition contains 0% to 2.5% sodium bicarbonate.

59. The process of claim 50 wherein the solution from the sodium bicarbonate decomposition contains 0% to 2.5% sodium bicarbonate.

60. The process of claim 38 wherein the solution from the sodium bicarbonate decomposition contains 6.7% to 30% sodium carbonate.

61. The process of claim 38 wherein the solution from the sodium bicarbonate decomposition contains from 12% to 27% sodium carbonate.

62. The process of claim 38 wherein water is added during the sodium bicarbonate decomposition to maintain a solution below the sodium carbonate crystallization concentration.

63. The process of claim 61 wherein the solution with sodium carbonate is fed to an evaporator.

64. The process of claim 63 wherein the evaporator further concentrates the solution to between 25% to 30% sodium carbonate.

65. The process of claim 63 wherein the vapor from the sodium bicarbonate decomposition is used, at least partially, to heat the evaporator.

66. The process of claim 63 wherein the vapor from the evaporator is used, at least partially, as stripping steam in the sodium bicarbonate decomposition step.

67. The process of claim 63 wherein the resulting concentrated solution from the evaporator is sent to the crystallizer and the crystallizer comprises a device selected from the group consisting of multiple effect and MVR crystallizers.

68. The process of claim 66 wherein at least a portion of the purge from the sodium carbonate monohydrate crystallizer is fed to a sodium bicarbonate crystallizer.

69. The process of claim 36 wherein the sodium bicarbonate crystallizer is a cooling crystallizer.

70. The process of claim 69 wherein carbon dioxide is injected into the crystallizer concurrently with the sodium bicarbonate crystallization.

71. The process of claim 68 wherein the liquid feed to the sodium bicarbonate crystallizer contains 0% to 4% sodium bicarbonate in solution.

72. The process of claim 64 wherein at least a portion of the solution from the evaporator is fed to a sodium bicarbonate crystallizer.

73. The process of claim 39 wherein at least part of the carbon dioxide in the vapor stream from the steam stripping is cooled to condense associate water, compressed, and introduced into the sodium bicarbonate crystallization.

74. The process of claim 39 wherein at least a portion of the carbon dioxide in the vapor stream from the steam stripping is recovered as a byproduct.

* * * * *